United States Patent
Ziemer et al.

(10) Patent No.: US 10,730,381 B2
(45) Date of Patent: Aug. 4, 2020

(54) TRANSMISSION FOR A MOTOR VEHICLE, AND DRIVE TRAIN FOR A MOTOR VEHICLE

(71) Applicant: ZF Friedrichshafen AG, Friedrichshafen (DE)

(72) Inventors: Peter Ziemer, Tettnang (DE); Michael Roske, Friedrichshafen (DE); Juri Pawlakowitsch, Kressbronn (DE); Thomas Rosemeier, Meckenbeuren (DE); Raffael Kuberczyk, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 30 days.

(21) Appl. No.: 16/313,999

(22) PCT Filed: May 16, 2017

(86) PCT No.: PCT/EP2017/061731
§ 371 (c)(1),
(2) Date: Dec. 28, 2018

(87) PCT Pub. No.: WO2018/001622
PCT Pub. Date: Jan. 4, 2018

(65) Prior Publication Data
US 2019/0193549 A1    Jun. 27, 2019

(30) Foreign Application Priority Data
Jun. 30, 2016   (DE) .................. 10 2016 211 891

(51) Int. Cl.
*F16H 3/66* (2006.01)
*B60K 6/365* (2007.10)
(Continued)

(52) U.S. Cl.
CPC .............. *B60K 6/365* (2013.01); *B60K 6/547* (2013.01); *F16H 3/66* (2013.01);
(Continued)

(58) Field of Classification Search
CPC ............ F16H 3/66; B60K 6/365; B60K 6/547
See application file for complete search history.

(56) References Cited

U.S. PATENT DOCUMENTS 6,468,175 B1    10/2002   Lehongre
8,419,585 B2 *   4/2013   Wittkopp ................ F16H 3/666
                                                                475/269
(Continued)

FOREIGN PATENT DOCUMENTS

DE         69930498 T2    10/2006
DE      102009018958 A1    2/2011
(Continued)

OTHER PUBLICATIONS

German Search Report DE102016211891.9, dated Feb. 23, 2017. (12 pages).
(Continued)

*Primary Examiner* — Derek D Knight
(74) *Attorney, Agent, or Firm* — Dority & Manning, P.A.

(57) ABSTRACT

A transmission for a motor vehicle having an input shaft, an output shaft, first, second, and third planetary gear sets, a plurality of shift elements, and an electric machine arranged axially parallel to the input shaft and operatively connected to the input shaft with a constant transmission ratio via a spur gear drive or a flexible traction drive mechanism. Various gear steps are formable between the input shaft and the output shaft through the planetary gear sets by selectively engaging shift elements of the plurality of shift elements. Elements of the third planetary gear set are arranged, at least partially, radially within an element of the
(Continued)

spur gear drive or of the flexible traction drive mechanism arranged coaxially to the input shaft, and together with the spur gear drive or the flexible traction drive mechanism in a plane oriented orthogonally to the axis of rotation of the input shaft.

9 Claims, 4 Drawing Sheets

(51) Int. Cl.
    *B60K 6/547*     (2007.10)
    *B60K 6/48*     (2007.10)
    *F16H 3/44*     (2006.01)

(52) U.S. Cl.
    CPC ............... *B60K 2006/4825* (2013.01); *F16H 2003/442* (2013.01); *F16H 2200/0008* (2013.01); *F16H 2200/201* (2013.01); *F16H 2200/2043* (2013.01); *F16H 2200/2097* (2013.01)

(56) References Cited

U.S. PATENT DOCUMENTS

| | | | |
|---|---|---|---|
| 8,602,933 | B2 | 12/2013 | Kawasaki et al. |
| 9,453,572 | B2 | 9/2016 | Tamai et al. |
| 9,683,632 | B2 * | 6/2017 | Lichtenegger ............ F16H 3/66 |
| 2007/0191169 | A1 | 8/2007 | Fujita et al. |
| 2012/0172170 | A1 | 7/2012 | Wittkopp et al. |
| 2014/0246935 | A1 | 9/2014 | Kesuya et al. |
| 2015/0051043 | A1 | 2/2015 | Beck et al. |
| 2019/0344772 | A1 * | 11/2019 | Kluge .................. B60W 10/02 |

FOREIGN PATENT DOCUMENTS

| | | |
|---|---|---|
| DE | 102010036748 A1 | 3/2011 |
| DE | 102011122613 A1 | 7/2012 |
| DE | 102012201685 A1 | 8/2013 |
| DE | 112012003406 T5 | 5/2014 |
| DE | 102014000880 A1 | 7/2015 |
| DE | 102015105040 A1 | 10/2015 |
| DE | 102014215092 A1 | 2/2016 |
| JP | 2010286092 A | 12/2010 |
| WO | WO 2016/016371 | 2/2016 |

OTHER PUBLICATIONS

International Search Report (English Translation) PCT/EP2017/061731 dated Jul. 12, 2017. (2 pages).

* cited by examiner

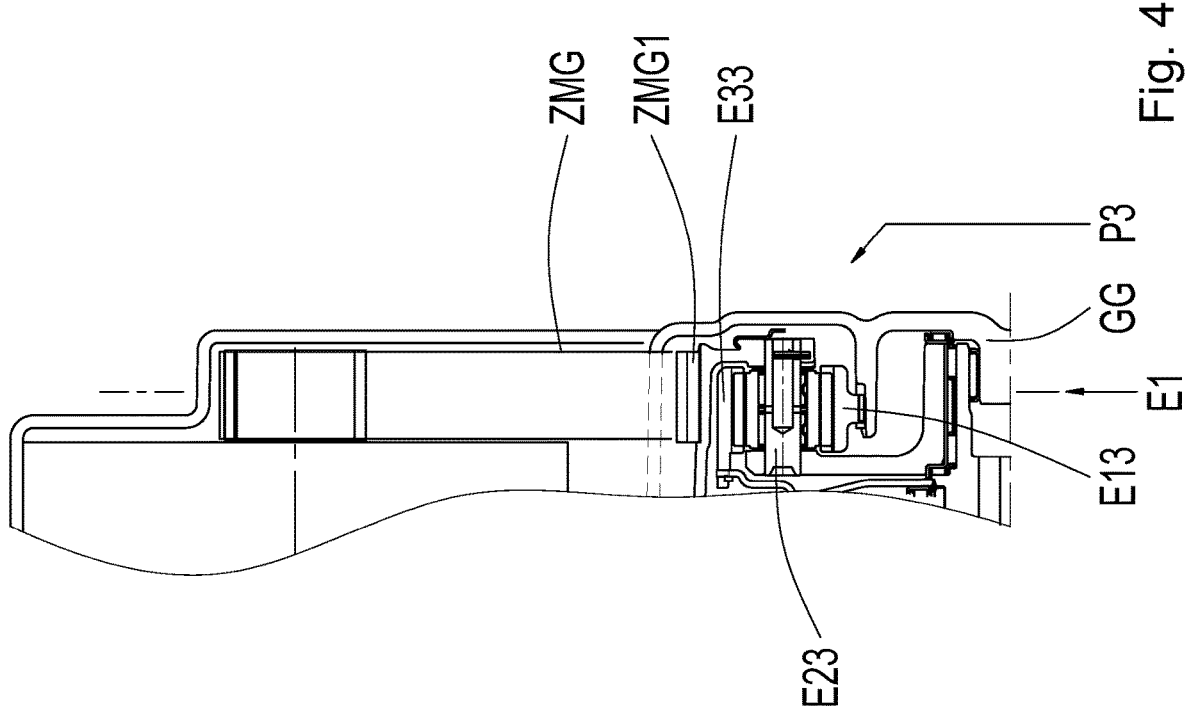
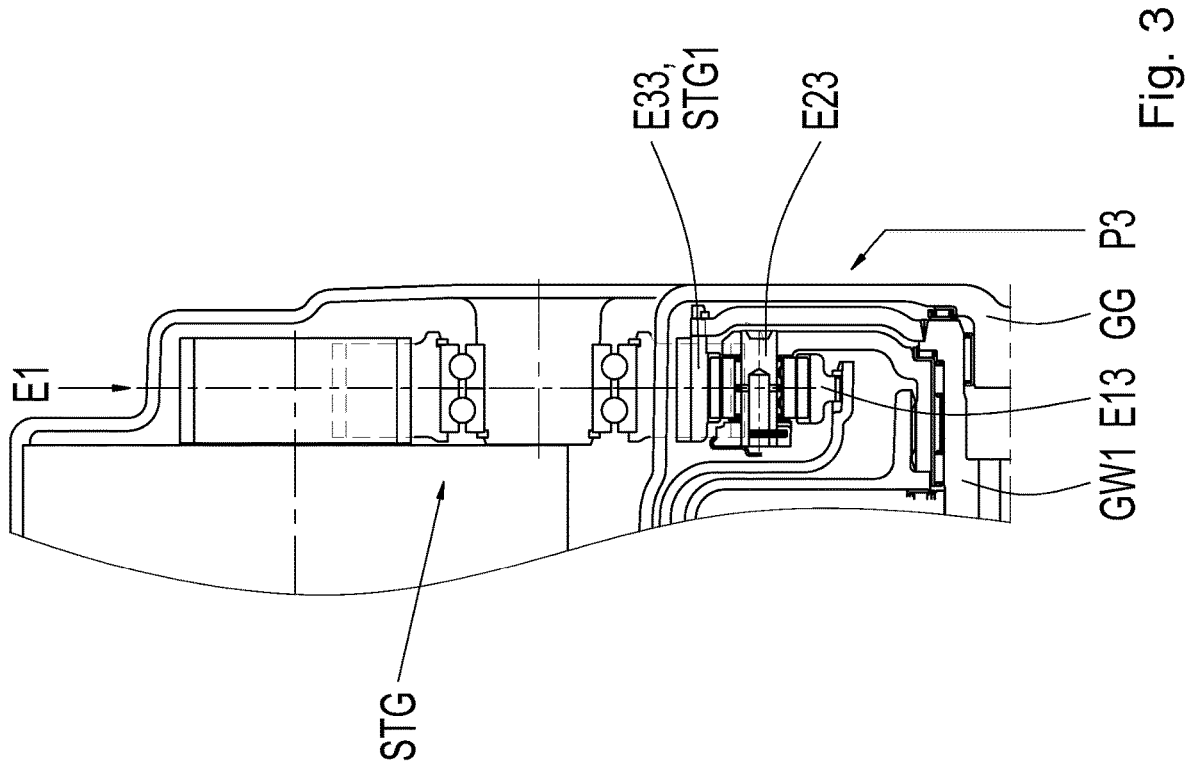

TRANSMISSION FOR A MOTOR VEHICLE, AND DRIVE TRAIN FOR A MOTOR VEHICLE

FIELD OF THE INVENTION

The invention relates generally to a transmission for a motor vehicle, and to a drive train for a motor vehicle having such a transmission. In this case, a transmission refers, in particular, to a multi-stage transmission, in which a multitude of gears, i.e., fixed translation ratios between the input shaft and the output shaft of the transmission, are preferably automatically shiftable with the aid of shift elements. In this case, the shift elements are clutches or brakes, for example. Such transmissions are utilized primarily in motor vehicles in order to adapt the rotational speed and torque output characteristic of the drive unit to the driving resistances of the vehicle in a suitable way.

BACKGROUND

Patent application DE 11 2012 003 406 T5 describes a hybrid drive device, in which an electric motor is arranged on a second axis which is parallel to a first axis. A transmission having an input shaft and a layshaft gear is arranged on the first axis. The layshaft gear is connected to driving wheels of a motor vehicle via a differential device. The electric motor is connected to the input shaft via a connecting mechanism, i.e. a spur gear drive. The gear-implementing section of the transmission is merely schematically represented.

Patent application DE 10 2009 018 958 A1 describes a multi-stage transmission having a housing, three planetary gear sets, and a first shaft, a second shaft, and a third shaft, wherein the third shaft is arranged axially offset with respect to the first shaft and the second shaft. According to the exemplary embodiment represented in FIG. 3, the multistage transmission has an electric machine which is arranged coaxially to the third shaft. The electric machine is permanently operatively connected to the second shaft via a chain or belt connection.

The two devices known from the related art are provided for use in a motor vehicle drive train which is aligned transversely to the direction of travel of the motor vehicle. These types of devices are usually to be optimized with respect to a preferably short axial installation length, since the axial assembly having a drive machine and a transmission is to be arranged between the longitudinal members of the front end of the motor vehicle.

The problem addressed by the invention is that of providing a transmission for a motor vehicle, which is distinguished by a particularly short axial installation length.

SUMMARY OF THE INVENTION

The transmission includes an input shaft, an output shaft, a plurality of planetary gear sets, a plurality of shift elements, and an electric machine arranged axially parallel to the input shaft. Through selective engagement of the shift elements, various gear steps are formable between the input shaft and the output shaft via the planetary gear sets. The electric machine is permanently operatively connected to the input shaft by a spur gear drive or a flexible traction drive mechanism, wherein the transmission ratio between the input shaft and the electric machine is constant.

The spur gear drive can have one or several intermediate gears, the axes of rotation of which are axially parallel to the axis of rotation of the electric machine rotor and axially parallel to the axis of rotation of the input shaft. Examples of flexible traction drive mechanisms are chains, V-belts, or even toothed belts.

According to the invention, elements of one of the gear-implementing planetary gear sets are arranged, at least in sections, radially within an element of the spur gear drive or of the flexible traction drive mechanism, which is arranged coaxially to the input shaft. These elements are arranged together with the spur gear drive or the flexible traction drive mechanism in a plane arranged at a right angle with respect to the axis of rotation of the input shaft.

In other words, one of the gear-implementing planetary gear sets is nested, at least in sections, radially within that element of the spur gear drive or of the flexible traction drive mechanism which is coaxial to the input shaft. Elements of the spur gear drive or of the flexible traction drive mechanism and elements of this planetary gear set are arranged in a common plane which is oriented at a right angle with respect to the input shaft.

Due to the arrangement according to the invention, the axial installation length of the transmission is reduced, since the spur gear drive or the flexible traction drive mechanism and the planetary gear sets are no longer successively axially arranged.

Preferably, the transmission includes an interface to a transmission-external drive unit, for example, to an internal combustion engine. The interface transmits a turning motion from the transmission-external drive unit to the input shaft of the transmission and is, for example, a flange or a spline. The interface is formable on the input shaft or on a connecting shaft which is connectable to the input shaft. The interface is also formable, for example, on a hydrodynamic torque converter which is connected to the input shaft and acts as a starting component. The spur gear drive or the flexible traction drive mechanism is arranged, in this case, at an axial end of the transmission which is positioned opposite the interface to the transmission-external drive unit.

According to one preferred embodiment, the spur gear drive or the flexible traction drive mechanism is directly operatively connected to the ring gear of that planetary gear set which is arranged radially within the element of the spur gear drive or of the flexible traction drive mechanism, which is arranged coaxially to the input shaft. An appropriate spur gear tooth system or a sprocket tooth system can be formed on the outer diameter of this ring gear. As a result, separate components and the related connecting elements can be omitted.

Preferably, the input shaft is axially mounted with respect to a housing of the transmission, wherein the above-described ring gear is permanently rotationally fixed to the input shaft. This simplifies the mounting of the element of the spur gear drive or of the flexible traction drive mechanism, which is arranged coaxially to the input shaft.

According to one alternative embodiment, the spur gear drive or the flexible traction drive mechanism is directly operatively connected to the planet carrier of that planetary gear set which is arranged radially within the element of the spur gear drive or of the flexible traction drive mechanism, which is arranged coaxially to the input shaft. The planet carrier, as a total shaft of the planetary gear set, still requires a stiff mounting. The mounting of the planet carrier can therefore also act as the mounting of the element of the spur gear drive or of the flexible traction drive mechanism, which is arranged coaxially to the input shaft.

Preferably, the remaining planetary gear sets, whose elements are not arranged radially within the spur gear drive or the flexible traction drive mechanism, have a total of four shafts, wherein one of these four shafts is an integral part of the output shaft. That planetary gear set which is arranged radially within the spur gear drive or the flexible traction drive mechanism is preferably an integral part of a shiftable power path between the input shaft and one of these four shafts. A shiftable power path refers, in this case, to an operative connection between the input shaft and one of the four shafts, which is establishable by engaging one of the shift elements. The operative connection can take place, in this case, either directly or via an intermediate connection of a planetary gear set located in the power flow.

The transmission can be an integral part of a drive train for a motor vehicle. The drive train includes, in addition to the transmission, an internal combustion engine which is torsionally elastically connected to the input shaft of the transmission via a transmission-internal or transmission-external torsional vibration damper, or is torsionally elastically connectable to the input shaft of the transmission via a separating clutch. The output shaft is operatively connected to a transmission-internal or transmission-external differential gear, wherein output shafts of the differential gear are connected to driving wheels of the motor vehicle. The transmission, including the electric machine, allows for several drive modes of the motor vehicle. In an electric mode, the motor vehicle is driven by the electric machine of the transmission. In an internal combustion engine-operated mode, the motor vehicle is driven by the internal combustion engine. In a hybrid mode, the motor vehicle is driven by the internal combustion engine as well as by the electric machine of the transmission.

BRIEF DESCRIPTION OF THE DRAWINGS

Exemplary embodiments of the invention are described in detail in the following with reference to the attached figures. In the figures, the following is shown:

FIG. 3 shows a partial, perspective view of the embodiment of the transmission shown in FIG. 1 in accordance with aspects of the present subject matter;

FIG. 4 shows a partial, perspective view of the embodiment of the transmission shown in FIG. 2 in accordance with aspects of the present subject matter.

DETAILED DESCRIPTION

Figure 1:
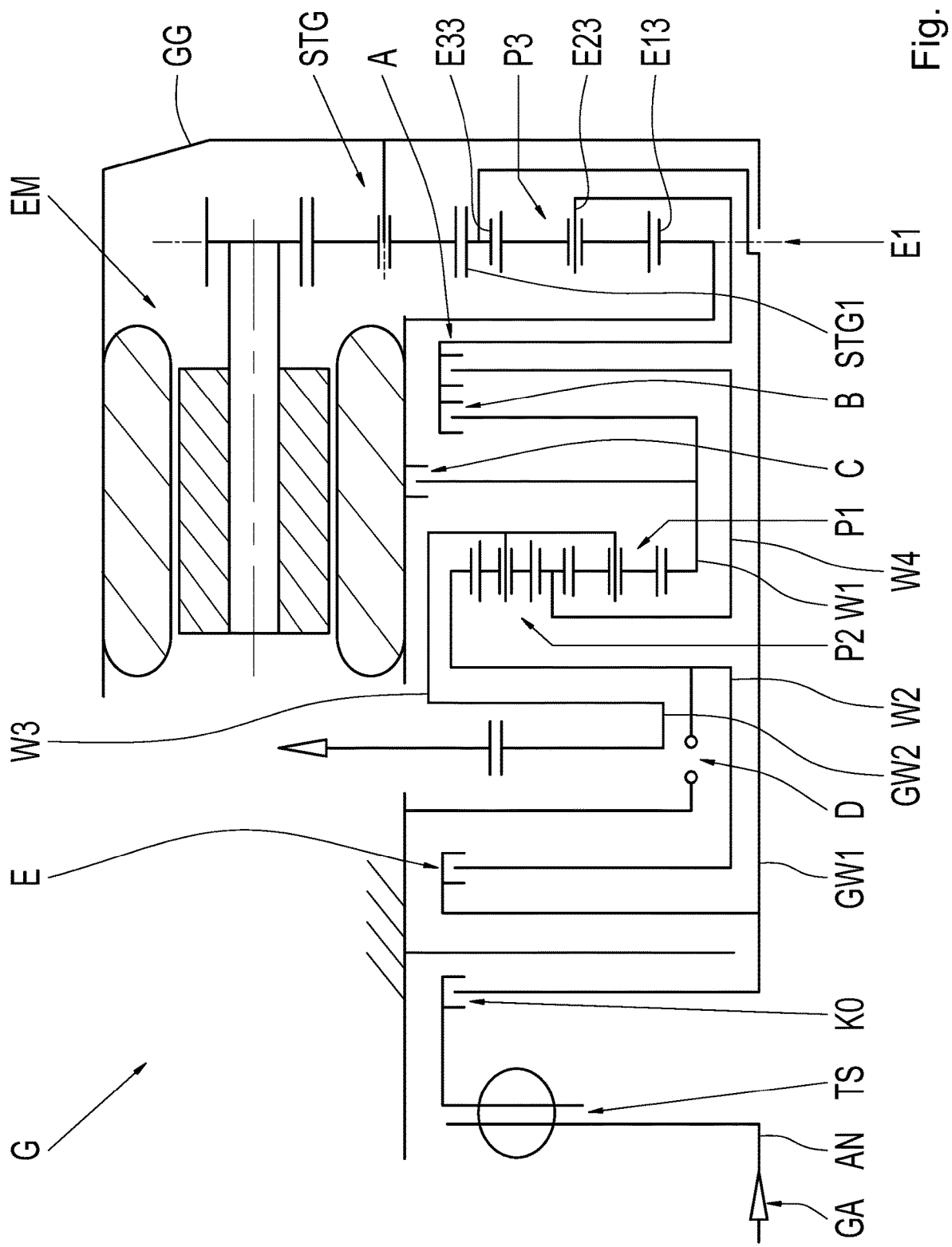
FIG. 1 shows a schematic view of one embodiment of a transmission in accordance with aspects of the present subject matter.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a transmission G according to a first exemplary embodiment. The transmission G includes an input shaft GW1, an output shaft GW2, a first planetary gear set P1, a second planetary gear set P2, a third planetary gear set P3, five shift elements A, B, C, D, E, an electric machine EM, a torsional vibration damper TS, a connecting shaft AN, and a separating clutch K0.

The first, second, and third planetary gear sets P1, P2, P3 are arranged coaxially to the input shaft GW1. The first and second planetary gear sets P1, P2 together have a total of four shafts, first shaft W1, second shaft W2, third shaft W3, and fourth shaft W4. The ring gear of the second planetary gear set P2 is an integral part of the second shaft W2. The planet carriers of the planetary gear sets P1, P2 are connected to one another and are integral parts of the third shaft W3 and are permanently connected to the output shaft GW2. The sun gear of the first planetary gear set P1 is an integral part of the first shaft W1. The ring gear of the first planetary gear set P1 is permanently connected to the sun gear of the second planetary gear set P2 and is an integral part of the fourth shaft W4. The first planetary gear set P1 is arranged radially within the second planetary gear set P2 in this case.

The fourth shaft W4 is connectable to the planet carrier E23 of the third planetary gear set P3 by engaging the first shift element A. The first shaft W1 is connectable to the planet carrier E23 of the third planetary gear set P3 by engaging the second shift element B. The first shaft W1 is rotationally fixable with respect to a housing GG of the transmission G by engaging the third shift element C. The second shaft W2 is rotationally fixable to the housing GG of the transmission G by engaging the fourth shift element D. The input shaft GW1 is connectable to the second shaft W2 by engaging the fifth shift element E. The ring gear E33 of the third planetary gear set P3 is permanently connected to the input shaft GW1. The sun gear E13 of the third planetary gear set P3 is permanently rotationally fixed with respect to the housing GG.

The transmission G has an interface GA to a transmission-external drive unit which is, for example, an internal combustion engine. The interface GA is configured for transmitting a rotational speed of the transmission-external drive unit to the input shaft GW1. A torsional vibration damper TS and a separating clutch K0 are arranged between the interface GA and the input shaft GW1. By engaging the separating clutch K0, the input shaft GW1 is connectable to a connecting shaft AN, on which the interface GA is arranged.

The output shaft GW2 includes, on one section, a spur gear tooth system which is utilized for the power transmission between the output shaft GW2 and a differential gear AG (not represented) arranged axially parallel to the output shaft GW2. The differential gear AG can be an integral part of the transmission G.

The electric machine EM includes a stator, which is rotationally fixed with respect to the housing GG, and a rotary rotor, and is arranged axially parallel to the input shaft GW1. The rotor is permanently operatively connected to the input shaft GW1 via a spur gear drive STG. In the represented exemplary embodiment, the spur gear drive STG includes an intermediate gear which is rotatably mounted on the housing GG. This intermediate gear intermeshes with an element STG1 of the spur gear drive STG, which is arranged coaxially to the input shaft GW1. The third planetary gear set P3 is arranged radially within the element STG1 in this case. Integral parts of the spur gear drive STG, as well as the sun gear E13, the planet carrier E23, and the ring gear E33 of the third planetary gear set P3 are arranged in a plane E1 which is oriented normal to or at a right angle to the input shaft axis. The element STG1 is directly connected to the ring gear E33 in this case.

Figure 2:
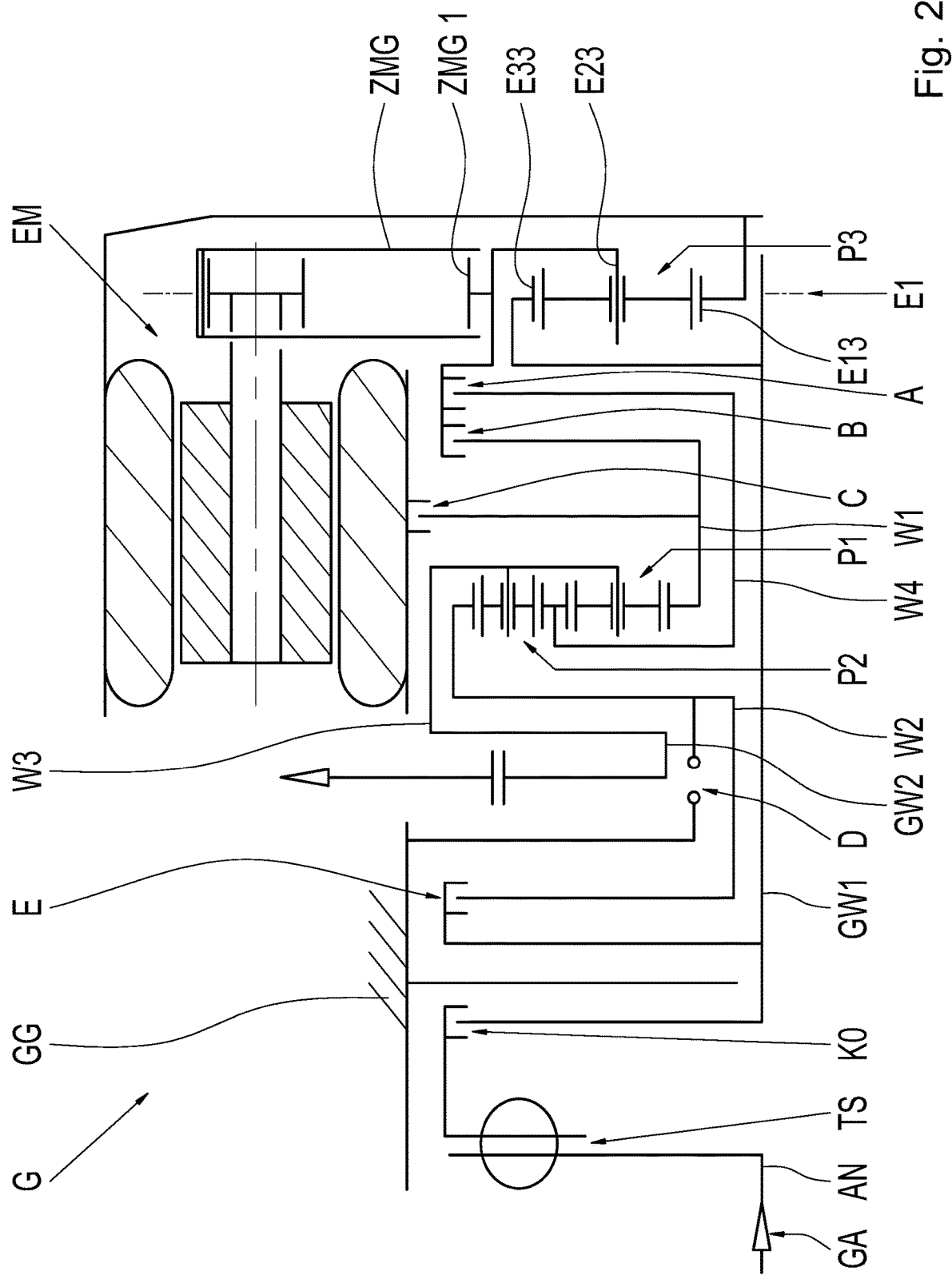
FIG. 2 shows a schematic view of another embodiment of a transmission in accordance with aspects of the present subject matter.

FIG. 2 shows a schematic view of a second exemplary embodiment of the transmission G, which essentially corresponds to the first exemplary embodiment represented in FIG. 1. However, instead of the spur gear drive STG, a flexible traction drive mechanism ZMG is now utilized for the power transmission between the electric machine EM and the input shaft GW1. An element ZMG1 of the flexible traction drive mechanism ZMG arranged coaxially to the input shaft GW1 is permanently connected to the planet carrier E23 in this case. Due to the permanent rotational fixation of the sun gear E13, there is a constant transmission ratio between the input shaft GW1 and the rotor of the electric machine EM.

FIG. 3 shows a partial, perspective view of the transmission G according to the first exemplary embodiment represented in FIG. 1, while a partial, perspective view of a transmission G according to the second exemplary embodiment represented in FIG. 2 is depicted in FIG. 4.

Figure 5:
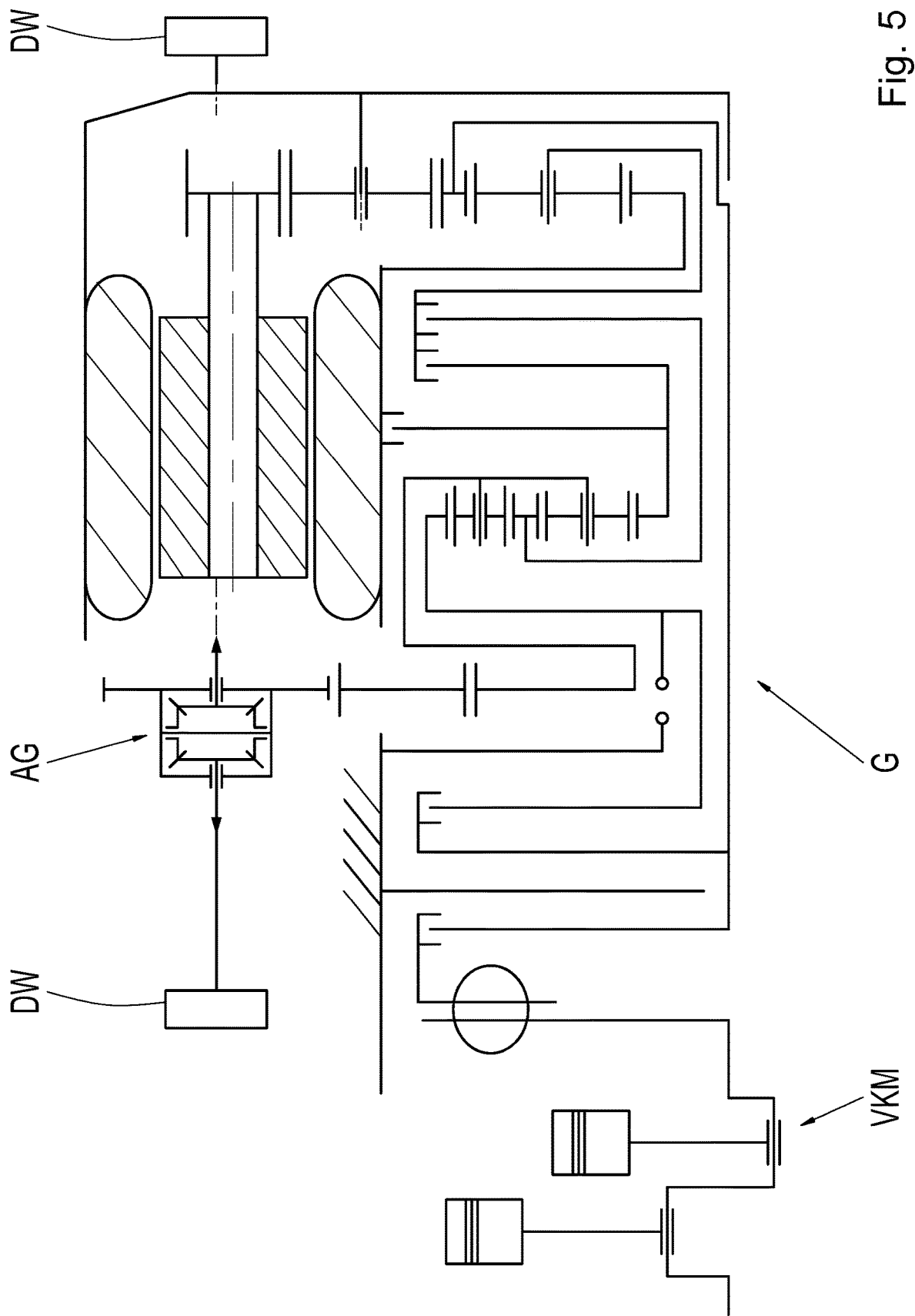
FIG. 5 shows a drive train for a motor vehicle having a transmission in accordance with aspects of the present subject matter.

FIG. 5 schematically shows a drive train of a motor vehicle having a transmission G. An internal combustion engine VKM is connected via the torsional vibration damper TS to the connecting shaft AN of the transmission G. The transmission G represented in FIG. 5 corresponds to the first exemplary embodiment of the invention represented in FIG. 1. This is to be considered merely as an example. The internal combustion engine VKM could even be connected via the torsional vibration damper TS directly to the input shaft GW1 of the transmission G. The drive train could even contain a hydrodynamic torque converter arranged in the power flow between the internal combustion engine VKM and the input shaft GW1 of the transmission G. Such a torque converter can even include a direct drive clutch. A person skilled in the art will freely configure the arrangement and the spatial position of the individual components of the drive train depending on the external peripheral conditions. The output shaft GW2 is operatively connected to a differential gear AG, via which the power present at the output shaft GW2 is distributed to driving wheels DW of the motor vehicle.

Modifications and variations can be made to the embodiments illustrated or described herein without departing from the scope and spirit of the invention as set forth in the appended claims.

REFERENCE CHARACTERS

G transmission
GG housing
GW1 input shaft
GW2 output shaft
EM electric machine
P1 first planetary gear set
P2 second planetary gear set
W1 first shaft
W2 second shaft
W3 third shaft
W4 fourth shaft
P3 third planetary gear set
E13 sun gear
E23 planet carrier
E33 ring gear
A first shift element
B second shift element
C third shift element
D fourth shift element
E fifth shift element
STG spur gear drive
STG1 element of the spur gear drive
ZMG flexible traction drive mechanism
ZMG1 element of the flexible traction drive mechanism
E1 plane
GA interface
K0 separating clutch
TS torsional vibration damper
AN connecting shaft
VKM internal combustion engine
AG differential gear
DW driving wheel

The invention claimed is:

1. A transmission (G) for a motor vehicle, comprising:
an input shaft (GW1);
an output shaft (GW2);
a first planetary gear set (P1), a second planetary gear set (P2), a third planetary gear (P3);
a plurality of shift elements (A, B, C, D, E); and
an electric machine (EM) arranged axially parallel to the input shaft (GW1) and operatively connected to the input shaft (GW1) with a constant transmission ratio via a spur gear drive (STG) or a flexible traction drive mechanism (ZMG),
wherein various gear ratios are formable between the input shaft (GW1) and the output shaft (GW2) through the first, second, and third planetary gear sets (P1, P2, P3) by selectively engaging shift elements of the plurality of shift elements (A, B, C, D, E),
wherein elements (E13, E23, E33) of the third planetary gear set (P3) are arranged, at least partially, radially within an element (STG1, ZMG1) of the spur gear drive (STG) or of the flexible traction drive mechanism (ZMG) arranged coaxially to the input shaft (GW1), and together with the spur gear drive (STG) or the flexible traction drive mechanism (ZMG) in a plane (E1) oriented at a right angle with respect to the axis of rotation of the input shaft (GW1).

2. The transmission (G) of claim 1, further comprising an interface (GA) to a transmission-external drive unit at one end of the transmission (G), the interface (GA) transmitting a turning motion of the transmission-external drive unit to the input shaft (GW1), wherein the spur gear drive (STG) or the flexible traction drive mechanism (ZMG) is arranged on another end of the transmission (G) positioned opposite the interface (GA) to the transmission-external drive unit.

3. The transmission (G) of claim 1, wherein the spur gear drive (STG) or the flexible traction drive mechanism (ZMG) is directly operatively connected to a ring gear (E33) of the third planetary gear set (P3) which is arranged radially within the element (STG1, ZMG1) of the spur gear drive (STG) or of the flexible traction drive mechanism (ZMG).

4. The transmission (G) of claim 3, wherein the element (STG1, ZMG1) of the spur gear drive (STG) or of the flexible traction drive mechanism (ZMG) arranged coaxially to the input shaft (GW1) is formed on the outer diameter of the ring gear (E33) of the third planetary gear set (P3).

5. The transmission (G) of claim 4, wherein the input shaft (GW1) is axially mounted with respect to a housing (GG) of the transmission (G), and the ring gear (E33) of the third planetary gear set (P3) is permanently rotationally fixed to the input shaft (GW1).

6. The transmission (G) of claim 1, wherein the spur gear drive (STG) or the flexible traction drive mechanism (ZMG) is directly operatively connected to a planet carrier (E23) of the third planetary gear set (P3) which is arranged radially within the element (STG1, ZMG1) of the spur gear drive (STG) or of the flexible traction drive mechanism (ZMG).

7. The transmission (G) of claim 1, wherein the first and second planetary gear sets (P1, P2) together have four shafts with a first shaft (W1), a second shaft (W2), a third shaft (W3), and a fourth shaft (W4), and the third shaft (W3) is an integral part of the output shaft (GW2).

8. The transmission (G) of claim 7, wherein the third planetary gear set (P3) is an integral part of a shiftable power path between the input shaft (GW1) and one of the four shafts (W1, W2, W3, W4) of the first and second planetary gear sets (P1, P2).

9. A drive train for a motor vehicle, comprising the transmission (G) of claim 1.

* * * * *